N. SANDERS & M. LUNDINE.
WHEEL PLOW.
APPLICATION FILED APR. 23, 1917.
1,233,129. Patented July 10, 1917.
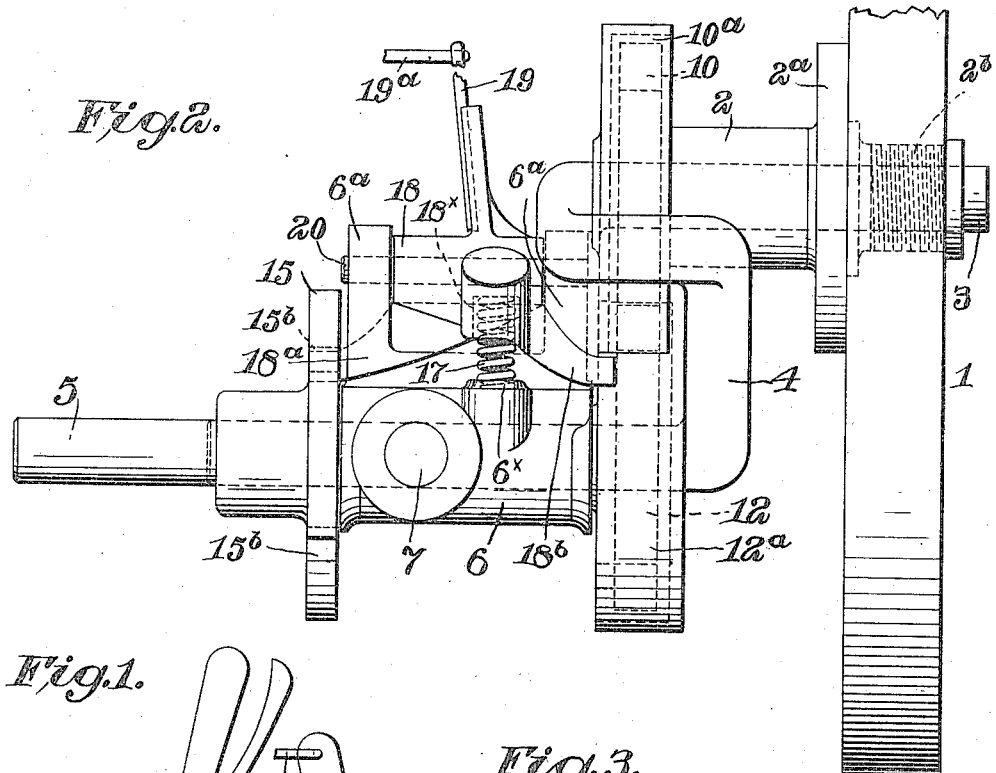
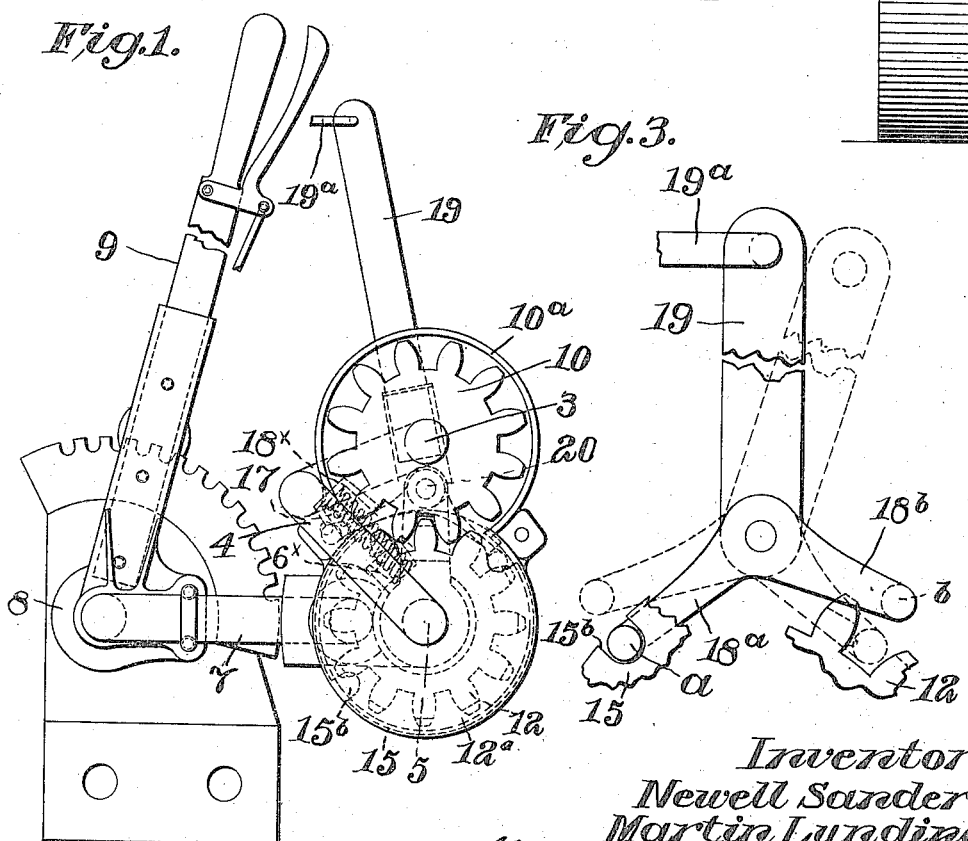
Inventors:
Newell Sanders and
Martin Lundine,
Shear Middleton Donaldson Shear
Atty's.

UNITED STATES PATENT OFFICE.

NEWELL SANDERS AND MARTIN LUNDINE, OF CHATTANOOGA, TENNESSEE; SAID LUNDINE ASSIGNOR TO SAID SANDERS.

WHEEL-PLOW.

1,233,129.      Specification of Letters Patent.      Patented July 10, 1917.

Application filed April 23, 1917. Serial No. 164,000.

*To all whom it may concern:*

Be it known that we, NEWELL SANDERS and MARTIN LUNDINE, citizens of the United States, and residents of Chattanooga, Tenn., have invented certain new and useful Improvements in Wheel-Plows, of which the following is a specification.

Our present invention relates to improvements in wheel plows and is designed as an improvement upon the construction disclosed in Letters Patent of the United States on the 6th day of March, 1917, #1,218,003.

The invention aims to simplify the construction and render it more durable and efficient in operation, and the invention includes the novel features of construction and arrangement and combination of parts as defined by the appended claims.

An embodiment of our invention is illustrated in the accompanying drawings, in which—

Figure 1 is a side elevation,

Fig. 2 is a plan view, and

Fig. 3 is a detail view.

In this drawing only a portion of the plow frame is shown as, our invention being applicable to any known type of wheel plow, and further illustration of plow parts of ordinary construction would tend to detract from the clearness of illustration rather than add thereto.

Referring more particularly to this drawing, the numeral 1 designates a supporting wheel which is secured against the flange $2^a$ of a hub 2 conveniently by means of a threaded boss or hub extension $2^b$.

This hub 2 is journaled on the stub axle portion 3 of a cranked shaft 4 which has a portion 5 journaled or rotatably mounted in a bearing member 6.

When the wheel 1, selected for effecting the automatic raising and lowering, such as intended by the present construction, is the land side wheel, this bearing member 6 is connected with the frame by a crank arm 7 which may be swung in its bearings 8 on the frame and held in its adjusted position by means of a hand lever 9 operating in the ordinary and well understood manner, so that when desired the raising and lowering may be effected manually without resorting to the power raising and lowering means.

Journaled on stub axle 3 and fast to the hub 2 is a spur gear 10 which is preferably inclosed in a gear casing $10^a$ and which meshes with a second spur gear 12 journaled on shaft portion 5 and also preferably inclosed by a gear case $12^a$.

Fast on the shaft portion 5 on the opposite side of bearing member 6 is a member 15, preferably of disk shape having notches or recesses $15^b$.

Bracket members or lugs $6^a$ carried by the bearing member 6 support a shaft 20 which serves as a bearing for a rocking member 18, which is provided with an upwardly extending lever arm 19 adapted to be connected by suitable means, such as a cord or cable $19^a$, to an operating handle or other suitable means in proximity to the driver's seat on the tractor (not shown).

This rocking member 18 has a pair of arms $18^a$ and $18^b$, the former of which extends into proximity to the edge of disk member 15 and carries a pin $a$ adapted to coöperate with the locking recesses $15^b$ in the edge thereof, while the latter $18^b$ extends into proximity to the gear 12 and has a pin or projection $b$ adapted to enter the spaces between the teeth of said gear, the arms being so arranged that only one of said pins will be in such locking engagement at a time. A spring 17 having its ends seated in cup-shaped recesses $6^x$ and $18^x$ in the parts 6 and 18 respectively, tends to rock said member so as to keep arm $18^a$ and its pin $a$ pressed normally toward disk 15.

Thus the locking pin $a$ will normally engage one of the recesses in the disk 15 and will hold the disk, and with it shaft portion 5, against rotation, and hence the plow will be maintained at a certain elevation.

During this time while the gears 10 and 12 are rotating, said rotation is without effect, the movement being purely an idle one. When it is desired to raise the plow, supposing it to be in its lowered position and to be drawn forwardly, the operator through lever 19 rocks the member 18 to disengage pin $a$ from the notch in disk 15 and simultaneously force pin $b$ between two of the teeth of spur gear 12, locking the latter against movement.

Continued rotation of spur gear 10 under the traction on wheel 1 causes said spur gear to roll around and upon gear 12 with a planetary movement, swinging arm or shaft portion 4 in the proper direction to effect the elevation of the plow.

This movement will continue until another notch 15ᵇ in the disk 15 registers with the pin b when the spring will at once rock member 18 to lock disk 15 and release spur gear 12 and the plow will be held in its elevated position as above described.

To lower the plow it is only necessary to move arm 19 to rock member 18 and withdraw pin b from locking engagement with disk 15 which will produce the same effect under the action of gravity but in a reverse direction.

As soon as the disk 15 has moved sufficiently to carry the notch 15ᵇ out of register with the pin, the latter will be held out by the periphery of the disk until the next notch is in alinement with the pin, so that it is only necessary to give an initial movement to lever 19.

What we claim is:—

1. In a wheel plow, a frame, a crank shaft having a shaft portion journaled therein, a supporting wheel rotatably connected with said crank shaft, a gear concentric with said supporting wheel and connected to be driven thereby, a second gear journaled on said shaft portion, a locking member fast on said shaft portion and means for alternately locking either said second gear or said locking member against movement.

2. In a wheel plow, a frame, a bearing member carried thereby, a crank shaft having a shaft portion journaled in said bearing member, a supporting wheel carried by the crank of said shaft, a gear concentric with said supporting wheel and connected to be driven thereby, a second gear journaled on said shaft portion at one side of the bearing member and meshing with said first named gear, a disk fast on said shaft portion at the opposite side of the bearing member and having peripheral notches and a rockable device supported by the frame and having locking projections adapted to be engaged at different times either with the teeth of said second gear or the notches in said disk, and means for operating said rockable member.

3. In a wheel plow, a frame, a bearing member carried thereby, a crank shaft having a shaft portion journaled in said bearing member, a supporting wheel carried by the crank of said shaft, a gear concentric with said supporting wheel and connected to be driven thereby, a second gear journaled on said shaft portion at one side of the bearing member and meshing with said first named gear, a disk fast on said shaft portion at the opposite side of the bearing member and having peripheral notches and a rockable device supported by the bearing member and having a pair of diverging arms carrying projections adapted to be engaged at different times either with the teeth of said second gear or the notches in said disk, a spring tending to rock said rockable device to hold one of the projections normally in one of the notches of the disk, and means for rocking said device against the tension of the spring.

4. In a wheel plow, a frame, a bearing member carried thereby, a crank shaft having a shaft portion journaled in said bearing member, a supporting wheel carried by the crank of said shaft, a gear concentric with said supporting wheel and connected to be driven thereby, a second gear journaled on said shaft portion at one side of the bracket and meshing with said first named gear, a disk fast on said shaft portion at the opposite side of the bearing member and having peripheral notches, a rockable device fulcrumed upon said bearing member and having arms upon opposite sides of its axis extending in opposite directions, one of said arms having a projection to engage between the teeth of said second gear when said rockable device is rocked in one direction, and the other a projection to engage the notches in said disk when said rockable device is rocked in the other direction, a spring having its ends seated in recesses in said rockable device and said bearing member, and an operating lever connected with said rockable device.

NEWELL SANDERS.
MARTIN LUNDINE.

Copies of this patent may be obtained for five cents each, by addressing the "Commissioner of Patents, Washington, D. C."